United States Patent
Haunhorst et al.

(10) Patent No.: US 8,967,177 B2
(45) Date of Patent: Mar. 3, 2015

(54) SEQUENCED BALL VALVE COUPLING

(75) Inventors: Gregory Alan Haunhorst, Monclova, OH (US); Stephen Carl Taras, Parma, OH (US)

(73) Assignee: Eaton Corporation, Cleveland, OH (US)

( * ) Notice: Subject to any disclaimer, the term of this patent is extended or adjusted under 35 U.S.C. 154(b) by 172 days.

(21) Appl. No.: 13/538,040

(22) Filed: Jun. 29, 2012

(65) Prior Publication Data

US 2013/0000763 A1 Jan. 3, 2013

Related U.S. Application Data

(60) Provisional application No. 61/503,854, filed on Jul. 1, 2011.

(51) Int. Cl.
  *F16K 5/00* (2006.01)
  *F16L 37/36* (2006.01)
  *F16L 37/373* (2006.01)

(52) U.S. Cl.
  CPC ............... *F16L 37/36* (2013.01); *F16L 37/373* (2013.01)
  USPC ............... 137/15.22; 137/614.01; 137/614.06

(58) Field of Classification Search
  CPC .......... F16K 35/14; F16L 37/36; F16L 37/33; F16I 37/23; F16I 37/46; F16I 37/47; F16I 37/113; F16I 37/107
  USPC ............. 137/614.01, 614.04, 614.06, 637.18, 137/628, 614.11, 15.22, 864–866, 637.1; 251/149.1, 149.9, 101–116, 86, 261, 251/406, 376
  See application file for complete search history.

(56) References Cited

U.S. PATENT DOCUMENTS

| | | | | |
|---|---|---|---|---|
| 2,660,457 A | * | 11/1953 | Mallon | 285/402 |
| 2,872,216 A | | 2/1959 | Kaiser | |
| 2,948,553 A | * | 8/1960 | Gill et al. | 137/614.02 |
| 3,159,180 A | * | 12/1964 | Courtot et al. | 137/614.06 |
| 4,438,779 A | * | 3/1984 | Allread | 137/614.06 |
| 4,622,997 A | * | 11/1986 | Paddington | 137/614.06 |
| 4,687,016 A | * | 8/1987 | Takahashi | 137/614.06 |
| 5,090,449 A | | 2/1992 | Fournier et al. | |
| 5,099,883 A | | 3/1992 | Maiville | |
| 5,251,940 A | | 10/1993 | De Moss et al. | |
| 5,332,001 A | * | 7/1994 | Brown | 137/614.06 |
| 5,402,825 A | * | 4/1995 | McCracken | 137/614.06 |
| 5,488,972 A | * | 2/1996 | McCracken et al. | 137/614.06 |
| 5,505,428 A | | 4/1996 | De Moss et al. | |
| 5,558,121 A | | 9/1996 | Webster et al. | |
| 5,595,217 A | | 1/1997 | Gillen et al. | |
| 6,056,011 A | * | 5/2000 | Bormioli | 137/614.06 |
| 6,945,273 B2 | * | 9/2005 | Reid | 137/614.06 |

(Continued)

*Primary Examiner* — Craig Schneider
*Assistant Examiner* — Craig J Price
(74) *Attorney, Agent, or Firm* — Jarett D. Millar

(57) ABSTRACT

Another aspect of the present disclosure relates to a valve assembly. The valve assembly includes a body that defines a bore that extends through the body. A ball valve assembly is engaged to the body. The ball valve assembly includes a ball valve disposed in the bore the body and an actuator that extends through the body. The ball valve defines a passage through the ball valve. The actuator is engaged to the ball valve and includes a plurality of teeth. A sleeve is disposed about the body. The sleeve is configured for at least partial rotation about the body. The sleeve includes a gear protrusion that has a plurality of teeth. The plurality of teeth engages the plurality of teeth of the actuator during rotation of the sleeve to actuate the ball valve between an open position and a closed position.

16 Claims, 9 Drawing Sheets

(56) References Cited

U.S. PATENT DOCUMENTS

| | | | |
|---|---|---|---|
| 7,021,669 B1 * | 4/2006 | Lindermeir et al. | 285/86 |
| 7,967,026 B2 * | 6/2011 | Chang et al. | 137/614.01 |
| 8,082,947 B2 * | 12/2011 | Chang et al. | 137/614.01 |
| 8,132,781 B2 * | 3/2012 | Haunhorst | 251/149.9 |
| 8,662,108 B2 | 3/2014 | Haunhorst | |
| 2010/0140522 A1 * | 6/2010 | Chang et al. | 251/315.16 |
| 2013/0032234 A1 | 2/2013 | Densel et al. | |

\* cited by examiner

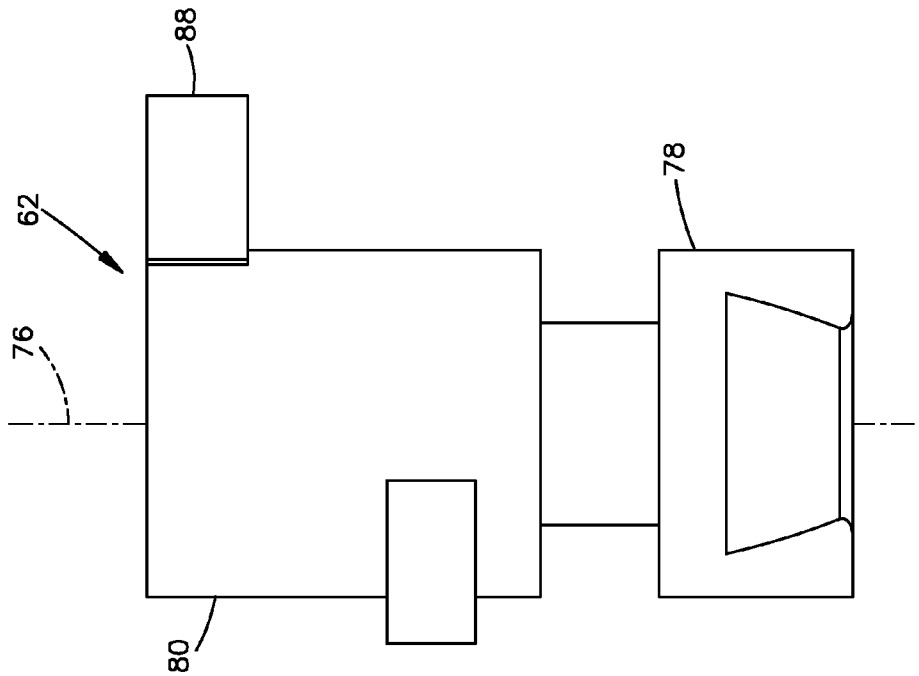
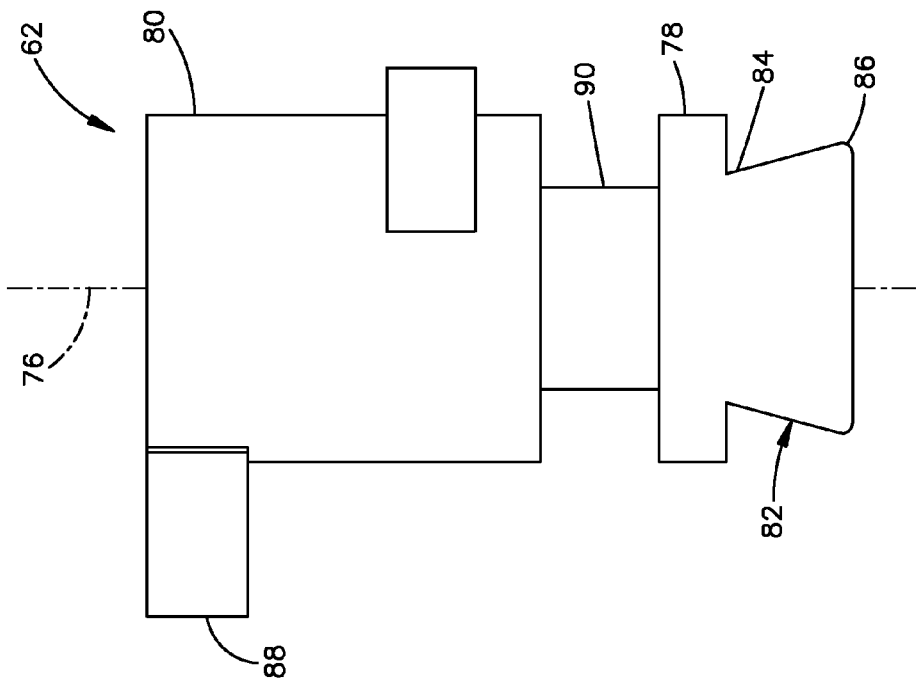

SEQUENCED BALL VALVE COUPLING

CROSS REFERENCE TO RELATED APPLICATION

This application claims the benefit of U.S. Provisional Patent Application Ser. No. 61/503,854, filed Jul. 1, 2011, which application is hereby incorporated by reference in its entirety.

BACKGROUND

Most quick connect couplings have valve components that remain in the flow path after the coupling is connected and valves opened. The fluid must flow around these restrictions resulting in turbulent flow that increases pressure drop and fluid temperature. Typically hydraulic systems are over designed to tolerate this energy loss and heat generation. However, some systems, such as electronics cooling systems, strive to minimize pump pressures, heat generation and energy consumption. Therefore, couplings with maximum flow and with an unobstructed flow path are desired.

Another key requirement of a quick connect coupling for an electronics cooling system is minimum spillage of the cooling fluid upon disconnection. This is desired to avoid shorting electronic components or causing other damage.

Couplings with rotating ball valves, such as the coupling available from Eaton-Aeroquip under Model No. FD83, provide a straight through, unobstructed flow path for maximum flow. The coupling available under Model No. FD83 is described in U.S. Pat. No. 4,438,779, the entire disclosure of which is hereby incorporated by reference. The coupling from Aeroquip having the Model Name Epsilon is another full flow, ball valve, coupling that utilizes concave/convex balls to achieve nearly zero spillage. The coupling available under the Model Name Epsilon is described in U.S. Pat. No. 5,488,972, the entire disclosure of which is also incorporated herein by reference.

Although these couplings are advantageous for use in many applications, there exists a need for a quick connect coupling with an unobstructed flow path to minimize pressure drop and thereby improve system (and/or energy) efficiency and also to minimize fluid spillage upon disconnection and to provide simple, safe operation.

SUMMARY

An aspect of the present disclosure relates to a fluid coupling assembly. The fluid coupling assembly includes a first valve assembly and second valve assembly selectively engaged with the first valve assembly. The first valve assembly includes a first body defining a bore that extends through the first body. A first ball valve assembly is engaged to the first body. The first ball valve assembly includes a first ball valve disposed in the bore of the first body and a first actuator that extends through the first body. The first ball valve defines a passage through the first ball valve. The first actuator is engaged to the first ball valve and includes a plurality of teeth. The second valve assembly includes a second body that defines a bore that extends through the second body. A second ball valve assembly is engaged to the second body. The second ball valve assembly includes a second ball valve disposed in the bore the second body and a second actuator that extends through the second body. The second ball valve defines a passage through the second ball valve. The second actuator is engaged to the second ball valve and includes a plurality of teeth. A sleeve is disposed about the second body. The sleeve is configured for at least partial rotation about the second body. The sleeve includes a gear protrusion that has a first plurality of teeth and a second plurality of teeth. The first plurality of teeth engages the plurality of teeth of the first actuator during only a first portion of rotation of the sleeve. The second plurality of teeth engages the plurality of teeth of the second actuator during only a second portion of rotation of the sleeve.

Another aspect of the present disclosure relates to a valve assembly. The valve assembly includes a body that defines a bore that extends through the body. A ball valve assembly is engaged to the body. The ball valve assembly includes a ball valve disposed in the bore the body and an actuator that extends through the body. The ball valve defines a passage through the ball valve. The actuator is engaged to the ball valve and includes a plurality of teeth. A sleeve is disposed about the body. The sleeve is configured for at least partial rotation about the body. The sleeve includes a gear protrusion that has a plurality of teeth. The plurality of teeth engages the plurality of teeth of the actuator during rotation of the sleeve to actuate the ball valve between an open position and a closed position.

Another aspect of the present disclosure relates to a method for assembling a fluid coupling. The method includes providing a first valve assembly and a second valve assembly. The first valve assembly includes a first body having a first axial end portion and an oppositely disposed second axial end portion. The first body defines a bore. A first ball valve is disposed in the bore. A fitting is engaged to the second axial end portion of the first body. The second valve assembly includes a second body having a first axial end portion and an oppositely disposed second axial end portion. The second body defines a bore. A second ball valve is disposed in the bore. A fitting is engaged to the second axial end portion. A sleeve defines a bore. The second body is disposed in the bore of the sleeve. The first axial end portion of the first body of the first valve assembly is inserted into the first axial end portion of the second body of the second valve assembly. The sleeve is rotated about the second body to actuate the first and second ball valve assemblies between an open position and a closed position.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 6 is a front view of the first actuator of FIG. 5.

FIG. 7 is a side view of the first actuator of FIG. 5.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
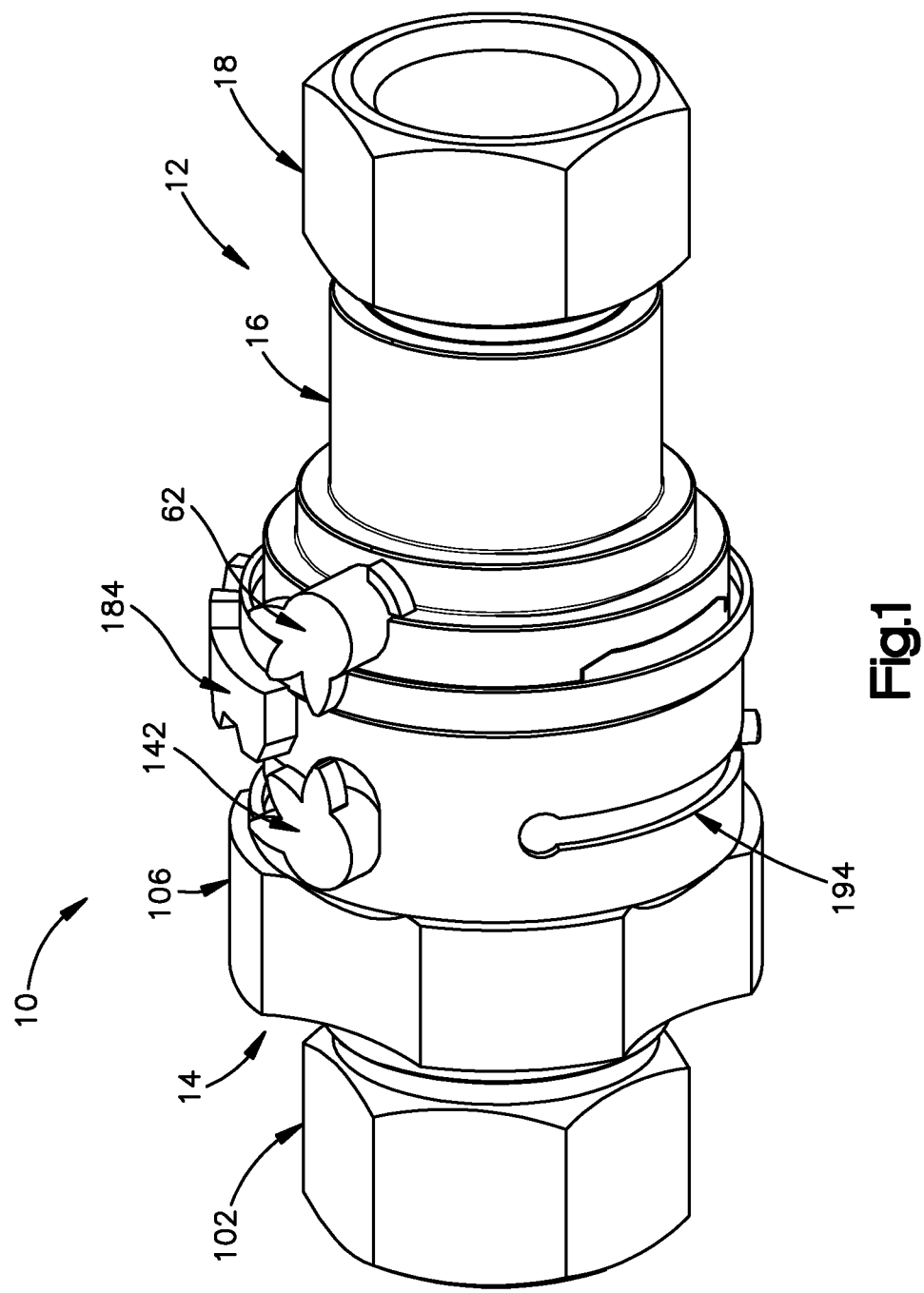
FIG. 1 is an isometric view of a fluid coupling assembly having exemplary features of aspects in accordance with the principles of the present disclosure.
Figure 2:
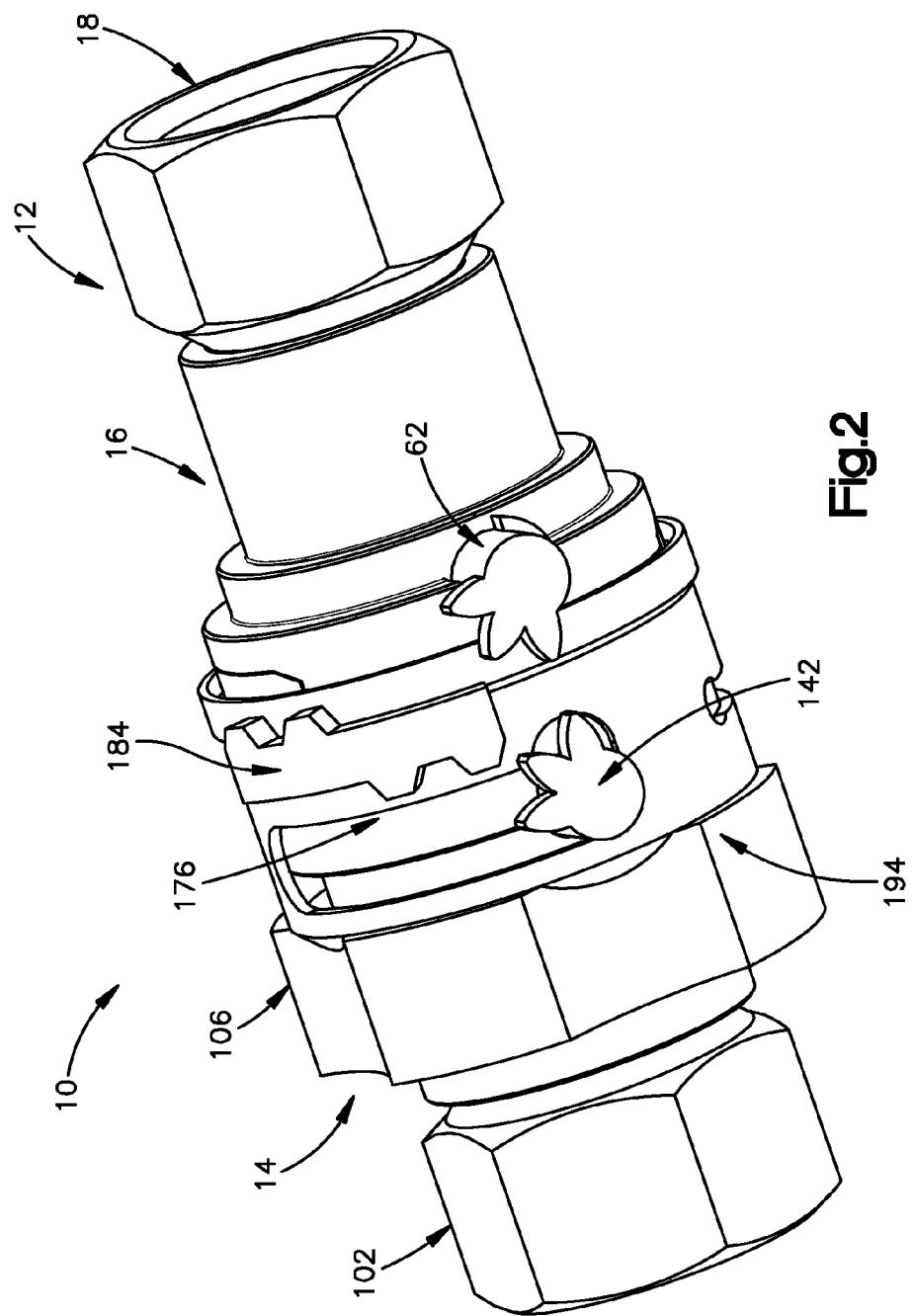
FIG. 2 is an isometric view of the fluid coupling assembly of FIG. 1.
Figure 3:
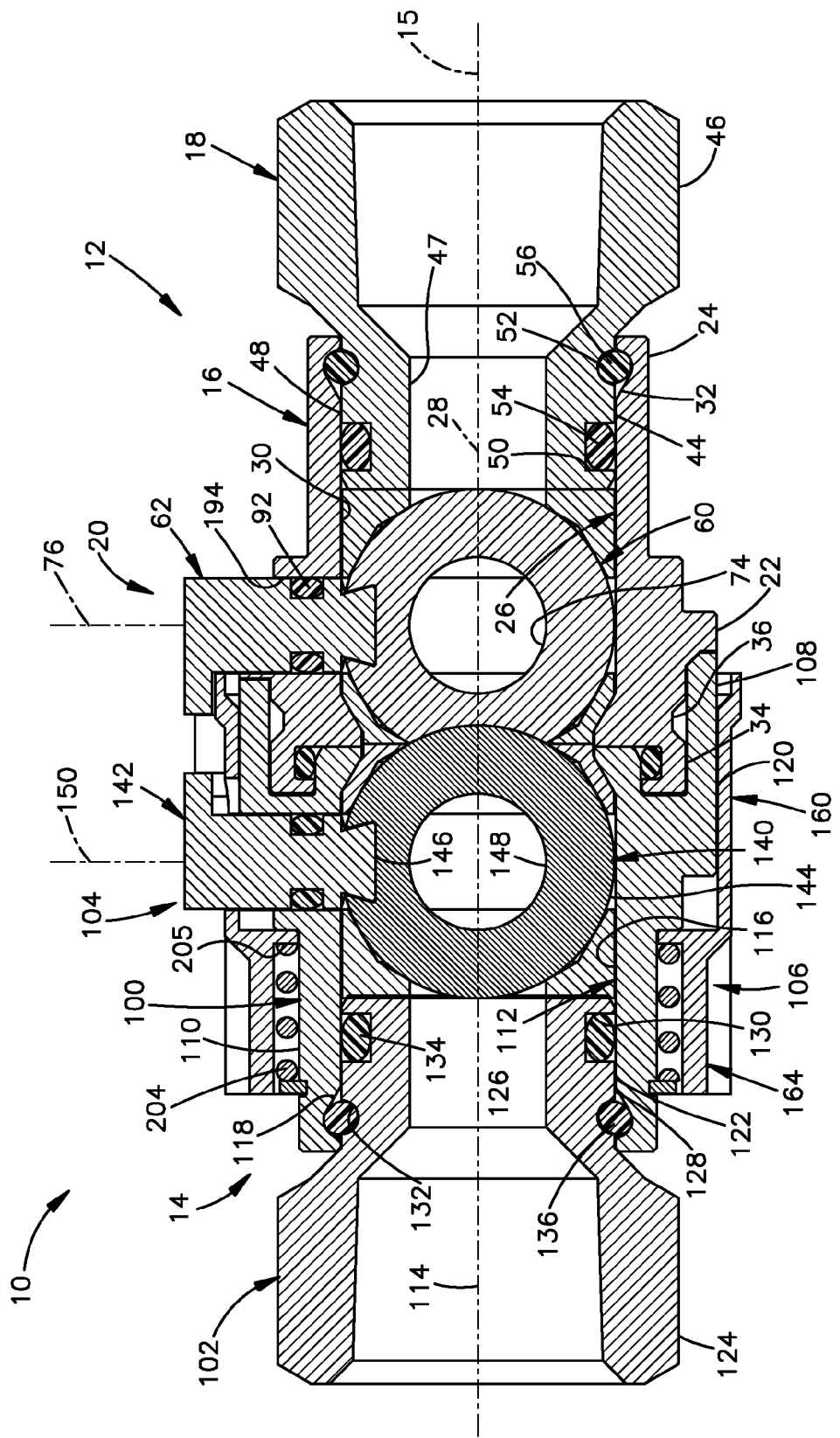
FIG. 3 is a cross-sectional view of the fluid coupling assembly of FIG. 1.
Figure 4:
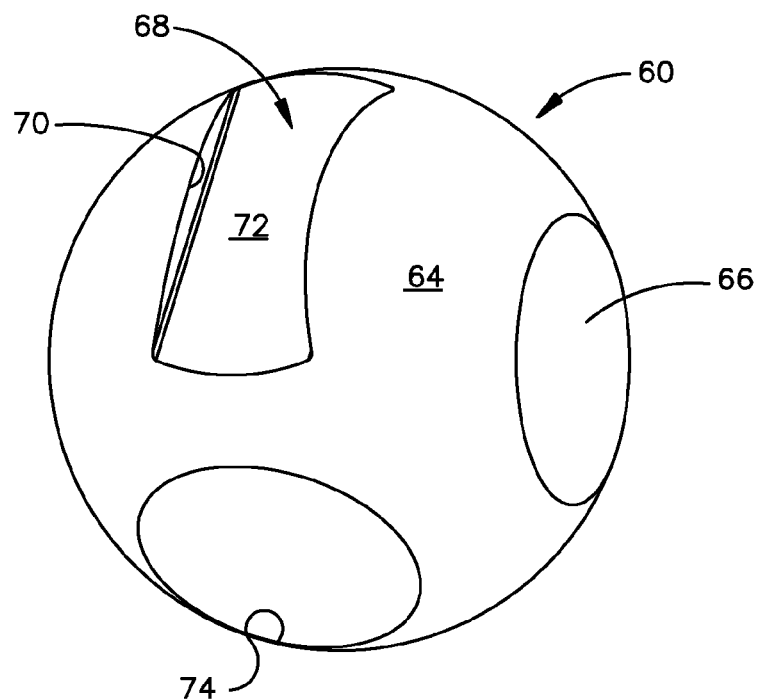
FIG. 4 is an isometric view of a first ball valve suitable for use with the fluid coupling of FIG. 1.
Figure 5:
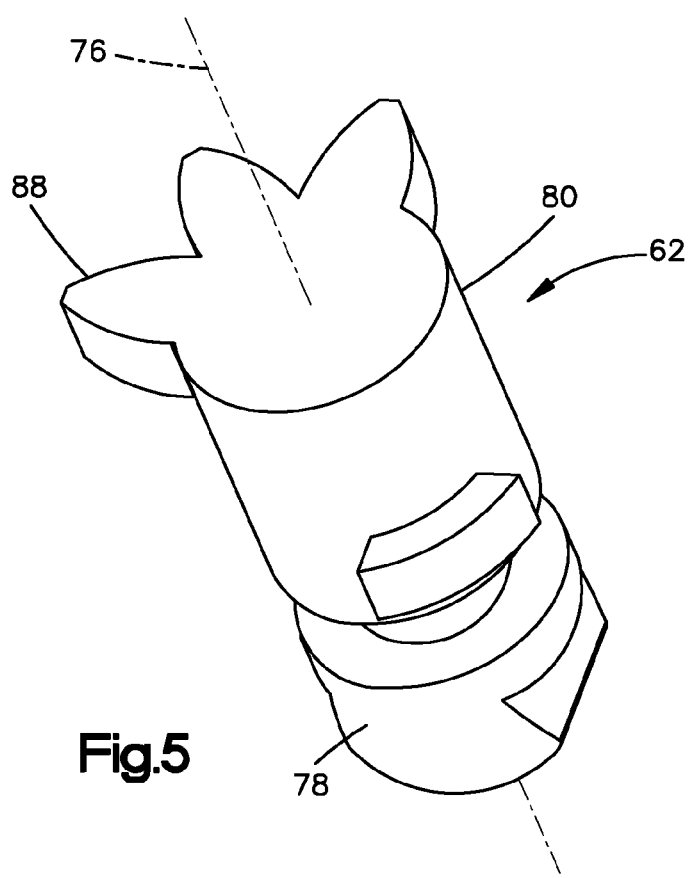
FIG. 5 is an isometric view of a first actuator suitable for use with the fluid coupling of FIG. 1.
Figure 8:
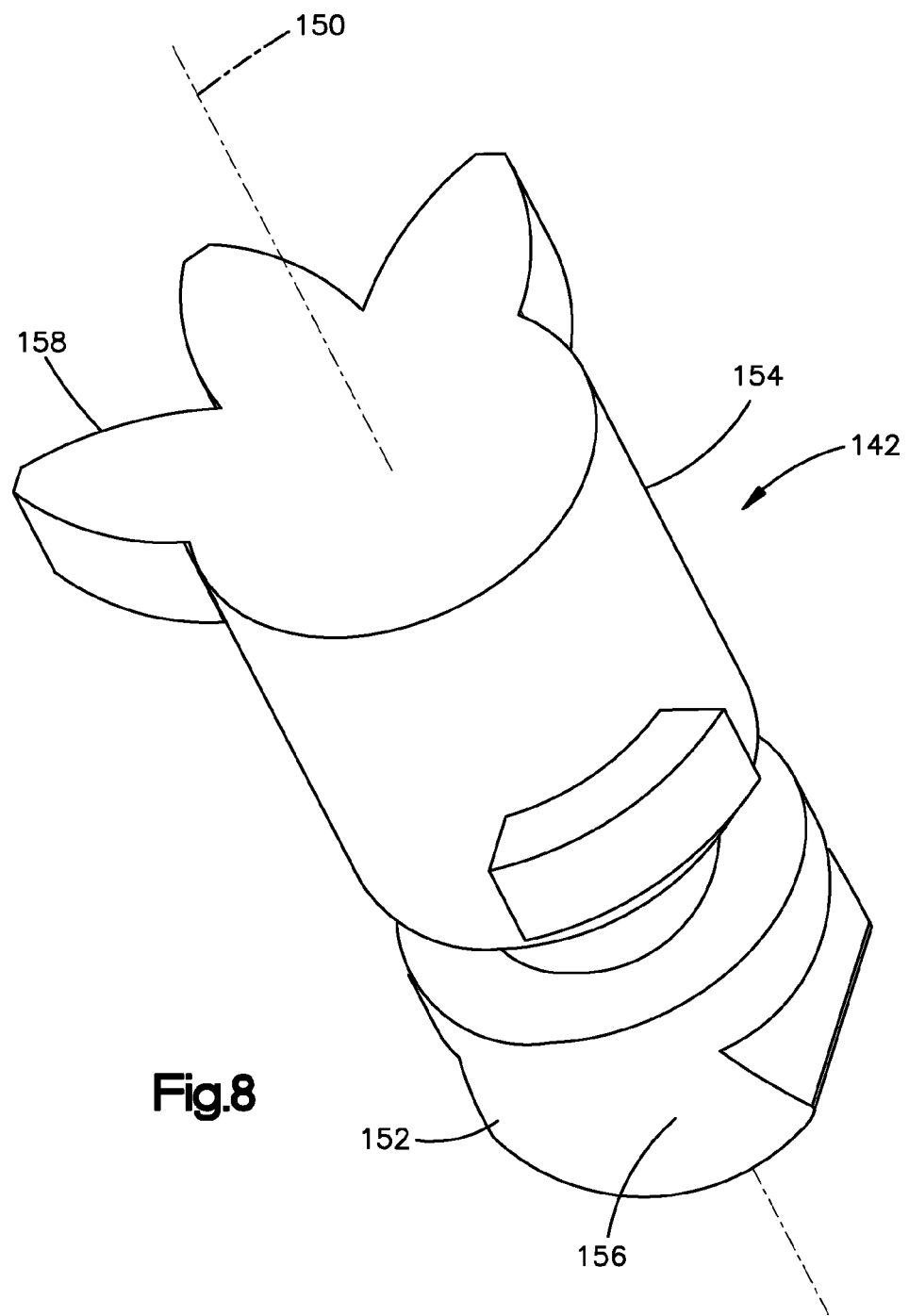
FIG. 8 is an isometric view of a second actuator suitable for use with the fluid coupling of FIG. 1.

Referring now to FIGS. 1-3, a fluid coupling assembly 10 is shown. The fluid coupling assembly 10 includes a first valve assembly 12 selectively engaged to a second valve assembly 14. The fluid coupling assembly 10 defines a central longitudinal axis 15 that extends through the fluid coupling assembly 10.

In the depicted embodiment, the first valve assembly 12 is a male valve assembly. The first valve assembly 12 includes a first body 16, a first fitting 18 and a first ball valve assembly 20.

The first body 16 is generally annular in shape. The first body 16 includes a first axial end portion 22 and an oppositely disposed second axial end portion 24. The first body 16 defines a bore 26 that extends through the first and second axial end portions 22, 24. The bore 26 defines a central axis 28 that extends through the bore 26.

The bore 26 includes an inner surface 30. The inner surface 30 defines a retaining groove 32 at the second axial end portion 24.

The first body 16 further includes an outer surface 34. In the depicted embodiment, an outer diameter of the outer surface 34 at the second axial end portion 24 is less than or equal to the outer surface 34 at the first axial end portion 22.

The outer surface 34 of the first axial end portion 22 defines a retention groove 36. The retention groove 36 includes sidewalls that are oriented at oblique angles relative to a base wall of the retention groove 36.

The first fitting 18 is engaged to the second axial end portion 24 of the first body 16. The first fitting 18 includes a first end portion 44 and an oppositely disposed second end portion 46. In the depicted embodiment, the first end portion 44 is a male end while the second end portion 46 is a female end. The first fitting 18 defines a bore 47 that extends through the first and second end portions 44, 46. When the first fitting 18 is engaged to the first body 16, the bore 47 of the first fitting 18 is generally aligned with the bore 26 of the first body 16. In the depicted embodiment, the bore 47 of the first fitting 18 is generally coaxial with the bore 26 of the first body 16 when the first fitting 18 is engaged to the first body 16.

In the depicted embodiment, the first end portion 44 includes an exterior surface 48. The exterior surface 48 of the first end portion 44 defines a first groove 50 and a second groove 52. The first groove 50 is adapted to receive a seal 54. The second groove 52 is adapted to receive a retaining ring 56. When the first end portion 44 of the first fitting 18 is engaged to the second axial end portion 24 of the first body 16, a first portion of the retaining ring 56 is disposed in the second groove 52 of the first fitting 18 while a second portion of the retaining ring 56 is disposed in the retaining groove 32 of the first body 16. With the retaining ring 56 disposed in the second groove 52 of the first fitting 18 and the retaining groove 32 of the first body 16, the first fitting 18 is secured to the first body 16.

When the first fitting 18 is engaged with the second axial end portion 24 of the first body 16, the seal 54, which is disposed in the first groove 50 of the first fitting 18, is in sealing contact with the inner surface 30 of the bore 26 of the first body 16. In one embodiment, the second axial end portion 24 of the first body 16 is crimped around the first end portion 44 of the first fitting 18.

Referring now to FIGS. 3-7, the first ball valve assembly 20 of the first valve assembly 12 is engaged to the first body 16 so that the first ball valve assembly 20 can rotate between an open position and a closed position (shown in FIG. 3). The first ball valve assembly 20 includes a first ball valve 60 and a first actuator 62 that is engaged to the first ball valve 60.

The first ball valve 60 includes an outer surface 64. The outer surface 64 is generally spherical in shape. In the depicted embodiment, the outer surface 64 includes an indentation 66. The indentation 66 is generally concave in shape and has a radius that is greater than or equal to the radius of the outer surface 64.

The outer surface 64 of the first ball valve 60 further defines a groove 68. In the depicted embodiment, the groove 68 is offset from the indentation 66 by about 90 degrees. The groove 68 includes an opening 70 disposed at the outer surface 64 of the first ball valve 60 and a base 72. In the depicted embodiment, the groove 68 has a dove-tail shape so that a width of the opening 70 is less than a width of the base 72.

The first ball valve 60 is disposed in the bore 26 of the second axial end portion 24 of the first body 16. The first ball valve 60 defines a passage 74 through the first ball valve 60. The passage 74 is adapted to allow fluid to pass through the first ball valve 60 when the first ball valve assembly 20 is in the open position and to block fluid from passing through the first ball valve 60 when the first ball valve assembly 20 is in the closed position. The passage 74 is disposed in the first ball valve 60 so that when the first ball valve assembly 20 is in the open position, the passage 74 is generally aligned with the bore 26 of the first body 16 and the bore 47 of the first fitting 18. When the first ball valve assembly 20 is in the closed position, the passage 74 is generally perpendicular to the bore 26 of the first body 16 and the bore 47 of the first fitting 18.

The first actuator 62 is engaged to the first ball valve 60. The first actuator 62 defines a first longitudinal axis 76 about which the first actuator 62 rotates to move the first ball valve 60 between the open and closed positions.

The first actuator 62 includes a first axial end portion 78 and an oppositely disposed second axial end portion 80. The first axial end portion 78 is engaged to the first ball valve 60. In the depicted embodiment, the first end portion 78 is keyed to the first ball valve 60 so that rotation of the first actuator 62 about the first longitudinal axis 76 rotates the first ball valve 60 about the first longitudinal axis 76.

The first end portion 78 includes a protrusion 82 that has a base end 84 and an oppositely dispose free end 86. In the depicted embodiment, the protrusion 82 has a dove-tail shape so that the base end 84 of the protrusion 82 has a width that is less than a width of the free end 86. In the depicted embodiment, the protrusion 82 of the first end portion 78 is engaged in the groove 68 of the first ball valve 60.

The second end portion 80 includes a plurality of teeth 88. In the depicted embodiment, the teeth 88 are external teeth. In another embodiment, the teeth 88 can be internal teeth. In the depicted embodiment, the second end portion 80 includes three teeth 88. The teeth 88 extend radially outwardly from the second end portion 80 in a direction that is generally perpendicular to the first longitudinal axis 76. In one embodiment, the plurality of teeth 88 extends around only a portion of the second end portion 80 of the first actuator 62. In the depicted embodiment, the plurality of teeth 88 is disposed about less than half of the circumference of the second end portion 80.

The first actuator 62 defines a circumferential groove 90 that is disposed between the first end portion 78 and the second end portion 80. The circumferential groove 90 is adapted to receive a seal 92.

With the first ball valve 60 disposed in the bore 26 of the second axial end portion 24 of the first body 16 and the first actuator 62 engaged to the first ball valve 60, the first actuator 62 extends through an opening 94 in the first body 16. The seal 92 is adapted to provide a seal between the first actuator 62 and the opening 94 in the first body 16.

Referring now to FIGS. 1-3 and 8, the second valve assembly 14 will be described. In the depicted embodiment, the second valve assembly 14 is a female valve assembly. The second valve assembly 14 includes a second body 100, a second fitting 102, a second ball valve assembly 104 and a sleeve 106.

The second body 100 is generally annular in shape. The second body 100 includes a first axial end portion 108 and an oppositely disposed second axial end portion 110.

The first axial end portion 108 includes a plurality of balls that is adapted to engage the retention groove 36 of the first axial end portion 22 of the first body 16 of the first valve assembly 12. The balls are symmetrically disposed about the first axial end portion 108 of the second body 100. The balls allow for a quick connect and disconnect of the first and second valve assemblies 12, 14.

The second body 100 defines a bore 112 that extends through the first and second axial end portions 108, 110. The bore 112 defines a central axis 114 that extends through the bore 112.

The bore 112 includes an inner surface 116. The inner surface 116 defines a retaining groove 118 at the second axial end portion 110.

The second body 100 further includes an outer surface 120. In the depicted embodiment, an outer diameter of the outer surface 120 at the second axial end portion 110 is less than or equal to the outer surface 120 at the first axial end portion 108.

The second fitting 102 is engaged to the second axial end portion 110 of the second body 100. The second fitting 102 includes a first end portion 122 and an oppositely disposed second end portion 124. In the depicted embodiment, the first end portion 122 is a male end while the second end portion 124 is a female end. The second fitting 102 defines a bore 126 that extends through the first and second end portions 122, 124. When the second fitting 102 is engaged to the second body 100, the bore 126 of the second fitting 102 is generally aligned with the bore 112 of the second body 100. In the depicted embodiment, the bore 126 of the second fitting 102 is generally coaxial with the bore 112 of the second body 100 when the second fitting 102 is engaged to the second body 100.

In the depicted embodiment, the second fitting 102 is similar in structure to the first fitting 18. The first end portion 122 of the second fitting 102 includes an exterior surface 128. The exterior surface 128 of the first end portion 122 of the second fitting 102 defines a first groove 130 and a second groove 132. The first groove 130 is adapted to receive a seal 134. The second groove 132 is adapted to receive a retaining ring 136. With the retaining ring 136 disposed in the second groove 132 of the second fitting 102 and the retaining groove 118 of the second body 100, the second fitting 102 is secured to the second body 100. With the second fitting 102 engaged with the second axial end portion 110 of the second body 100, the second axial end portion 110 of the second body 100 can be crimped around the first end portion 122 of the second fitting 102.

The second ball valve assembly 104 is structurally similar to the first ball valve assembly 20. The second ball valve assembly 104 of the second valve assembly 14 is engaged to the second body 100 so that the second ball valve assembly 104 can rotate between an open position and a closed position (shown in FIG. 3). The second ball valve assembly 104 includes a second ball valve 140 and a second actuator 142 that is engaged to the second ball valve 140.

The second ball valve 140 includes an outer surface 144 that is generally spherical in shape. The outer surface 144 defines a groove 146 that is generally similar in shape to the groove 68 in the first ball valve 60. The groove 146 of the second ball valve 140 is generally dove-tail shaped.

The second ball valve 140 defines a passage 148 that extends through the second ball valve 140. The passage 148 is adapted to allow fluid to pass through the second ball valve 140 when the second ball valve assembly 104 is in the open position and to block fluid from passing through the second ball valve 140 when the second ball valve assembly 104 is in the closed position. The passage 148 is disposed in the second ball valve 140 so that when the second ball valve assembly 104 is in the open position, the passage 148 is generally aligned with the bore 112 of the second body 100 and the bore 126 of the second fitting 102. When the second ball valve assembly 104 is in the closed position, the passage 148 is generally perpendicular to the bore 112 of the second body 100 and the bore 126 of the second fitting 102.

The second actuator 142 is structurally similar to the first actuator 62. The second actuator 142 defines a second longitudinal axis 150 about which the second actuator 142 rotates to move the second ball valve 140 between the open and closed positions.

The second actuator 142 includes a first axial end portion 152 and an oppositely disposed second axial end portion 154. The first axial end portion 152 includes a protrusion 156. In the depicted embodiment, the protrusion 156 is dove-tail shaped. The protrusion 156 is engaged to groove 146 of the second ball valve 140. In the depicted embodiment, the protrusion 156 of the first end portion 152 is keyed to the second ball valve 140 so that rotation of the second actuator 142 about the second longitudinal axis 150 rotates the second ball valve 140 about the second longitudinal axis 150.

The second end portion 154 includes a plurality of teeth 158 (shown in FIGS. 1 and 2) that extends radially outwardly from the second end portion 154 in a direction that is generally perpendicular to the second longitudinal axis 150. In one embodiment, the plurality of teeth 158 extends around only a portion of the second end portion 154 of the second actuator 142.

Referring now to FIGS. 1-3, 9 and 10, the sleeve 106 is disposed about the outer surface 120 of the second body 100. The sleeve 106 is generally annular in shape. The sleeve 106 is adapted to rotate about the central longitudinal axis 15 of the fluid coupling assembly 10 between a first rotary position, in which the first and second ball valves 60, 140 are in the open position, and a second rotary position, in which the first and second ball valves 60, 140 are in the closed position. In addition, the sleeve 106 is adapted to move in an axial direction along the central longitudinal axis 15 between a first axial position, in which the first valve assembly 12 is connected to the second valve assembly 14, and a second axial position, in which the first valve assembly 12 can be disconnected from the second valve assembly 14.

The sleeve 106 includes a first portion 160 having a first end surface 162 and a second portion 164 having a second end surface 166. The sleeve 106 defines an inner bore 168 that extends through the first and second end surfaces 162, 166 in an axial direction. The inner bore 168 defines a central axis 170.

In the depicted embodiment, the second body 100 is disposed in the inner bore 168 of the sleeve 106 so that the central axis 170 of the sleeve 106 is generally aligned with the central axis 114 of the bore 112 of the second body 100. The first portion 160 of the sleeve 106 is disposed adjacent to the first axial end portion 108 of the second body 100 while the second portion 164 of the sleeve 106 is disposed adjacent to the second axial end portion 110 of the second body 100.

The sleeve 106 further includes an exterior surface 172 and an oppositely disposed interior surface 174. The first portion 160 of the sleeve 106 includes a first slot 176 that extends through the exterior and interior surfaces 172, 174. The first slot 176 is adapted to receive the second actuator 142 of the second ball valve assembly 104.

The first slot 176 extends in a circumferential direction. In the depicted embodiment, the first slot 176 extends in a circumferential direction that is generally perpendicular to the central axis 170 of the sleeve 106. The first slot 176 includes a first end 178 and an oppositely disposed second end 180. The first end 178 of the first slot 176 has a first width $W_1$ as measured in an axial direction that is generally aligned with the central axis 170. The second end 180 is elongated in an axial direction that is generally parallel to the central axis 170. The second end 180 has a second width $W_2$. In the depicted embodiment, the second width of the second end 180 is greater than the first width of the first end 178.

The sleeve 106 further includes a gear protrusion 182. The gear protrusion 182 extends outwardly in a radial direction from the exterior surface 172 of the sleeve 106. The gear protrusion 182 is circumferentially disposed about the sleeve 106 so that the gear protrusion 182 extends along the exterior surface 172 in a direction that is generally perpendicular to the central axis 170. The gear protrusion 182 is disposed between the first slot 176 and the first end surface 162 of the sleeve 106.

The gear protrusion 182 includes a rail 184 having first side 186 and an oppositely disposed second side 188. In the depicted embodiment, the rail 184 is generally linear. The first side 186 of the rail 184 faces toward the first end surface 162 of the sleeve 106 while the second side 188 faces toward the second end surface 166 of the sleeve 106. The gear protrusion 182 further includes a first plurality of teeth 190 and a second plurality of teeth 192. The first plurality of teeth 190 extend outwardly from the first side 186 of the rail 184 of the gear protrusion 182 in a first direction that is generally parallel to the central axis 170 while the second plurality of teeth 192 extend outwardly from the second side 188 in a second direction that is opposite the first direction. The second direction is generally parallel to the central axis 170.

The first plurality of teeth 190 is adapted for engagement with the plurality of teeth 88 of the first actuator 62 while the second plurality of teeth 192 is adapted for engagement with the plurality of teeth 158 of the second actuator 142. In the depicted embodiment, each of the first and second pluralities of teeth 190, 192 includes at least two teeth.

The first plurality of teeth 190 are offset from the second plurality of teeth 192 along the rail 184 of the gear protrusion 182. The offset of the first and second pluralities of teeth 190, 192 allow for the first and second actuators 62, 142 to be actuated sequentially rather than in unison. In the depicted embodiment, the first and second pluralities of teeth 190, 192 are disposed in a non-overlapping configuration along the rail 184 of the gear protrusion 182.

The first portion 160 of the sleeve 106 further defines a second slot 194. The second slot 194 includes a first end 196 and an oppositely disposed second end 198. In the depicted embodiment, the second slot 194 is aligned with the first slot 176 so that the first end 196 of the second slot 194 is adjacent to the second end 180 of the first slot 176. While the first end 196 of the second slot 194 is adjacent to the second end 180 of the first slot 176, the first end 196 of the second slot 194 is offset from the second end 180 of the first slot 176.

In the depicted embodiment, each of the first and second ends 196, 198 has a width that is greater than a width of the second slot 194. The second end 198 of the second slot 194 is elongated in an axial direction that is generally parallel to the central axis 170. The width of the second end 198 of the second slot 194 is greater than the width of the first end 196. The increased widths of the second end 180 of the first slot 174 and the second end 198 of the second slot 194 allow the sleeve 106 to be moved in an axial direction from the first axial position to the second axial position.

In the depicted embodiment, the second portion 164 of the sleeve 106 includes a gripping portion 200. In one embodiment, the gripping portion 200 includes a plurality of indentations 202 disposed about the second portion 164.

A spring 204 acts against a shoulder 205 extending inwardly from the interior surface 174 of the second portion 164 of the sleeve 106. The spring 204 biases the sleeve 106 in an axial direction toward the first axial position, which is toward the first axial end portion 108 of the second body 100.

Figure 9:
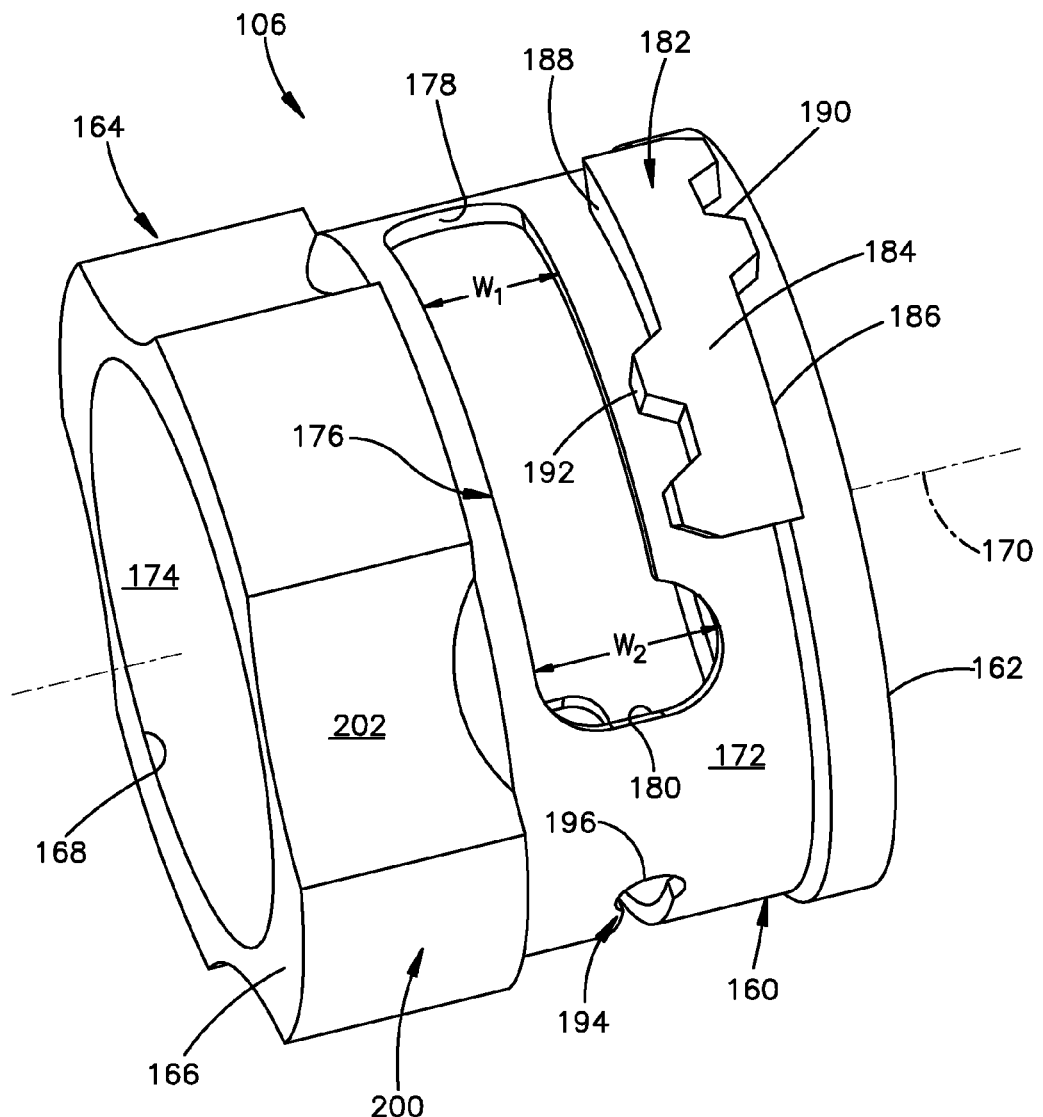
FIG. 9 is an isometric view of a sleeve suitable for use with the fluid coupling assembly of FIG. 1.
Figure 10:
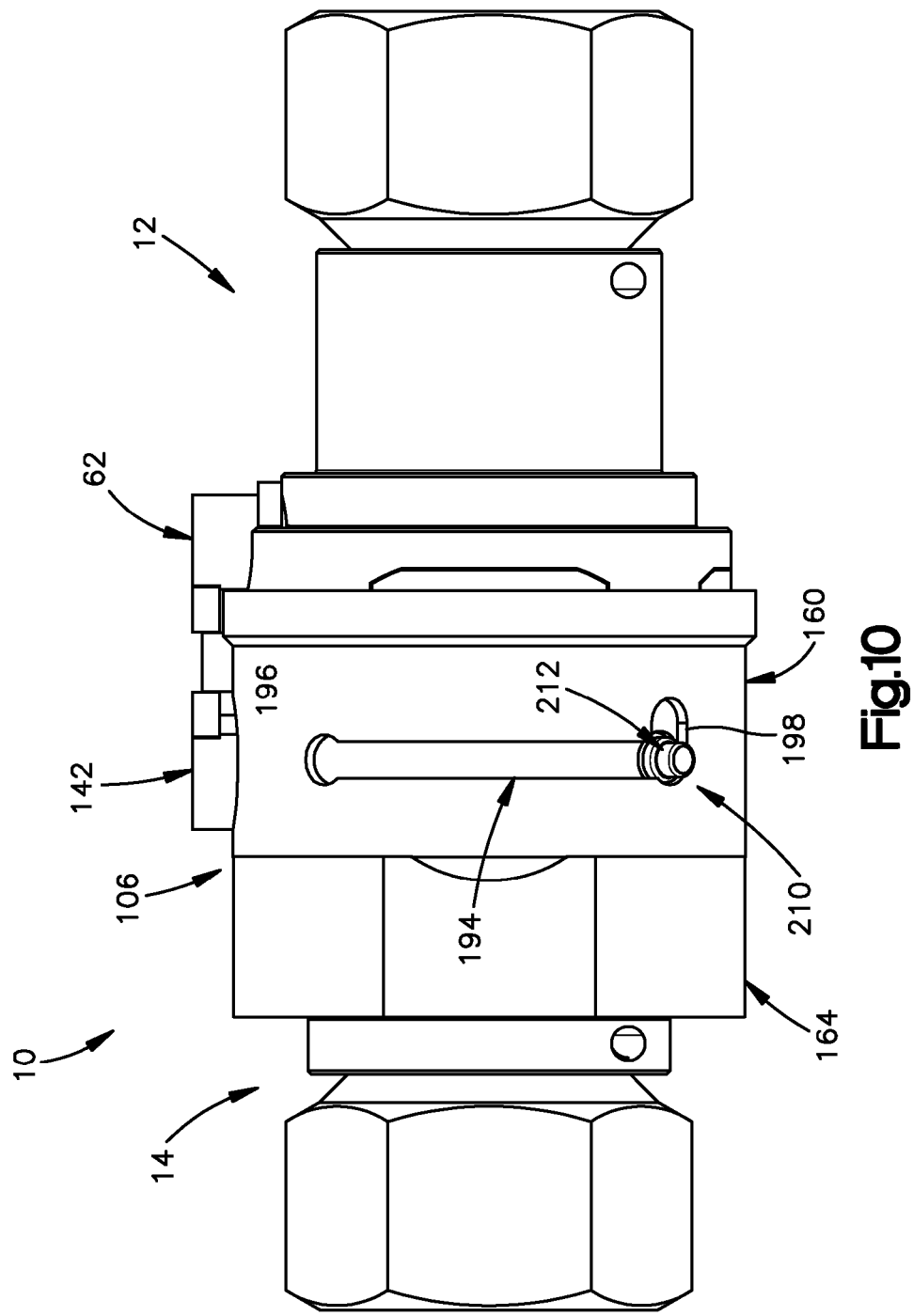
FIG. 10 is an isometric view of the fluid coupling assembly of FIG. 1.
Figure 11:
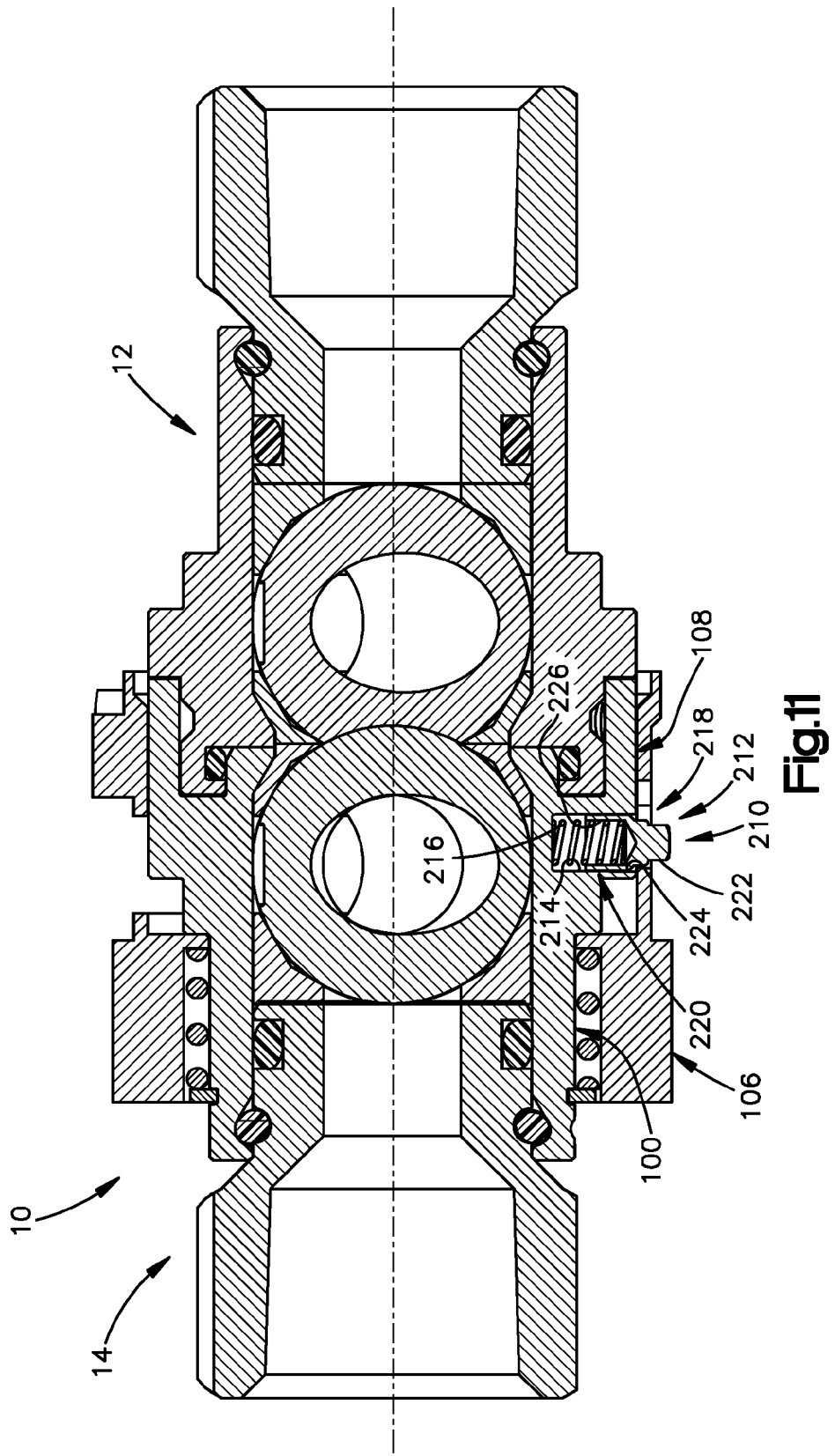
FIG. 11 is a cross-sectional view of the fluid coupling assembly of FIG. 1.

Referring now to FIGS. 9-11, a locking mechanism 210 will be described. The locking mechanism 210 is adapted to retain the sleeve 106 in the first or second rotary positions. The locking mechanism 210 includes a pin 212 disposed in an opening 214 defined by the first axial end portion 108 of the second body 100 and a spring 216 that biases the pin 212 radially outward from the second body 100.

The pin 212 includes a front portion 218 and a rear portion 220. The front portion 218 includes a tip portion 222 and a shoulder portion 224. The tip portion 222 is generally cylindrical in shape and has an outer diameter that is less than an outer diameter of the shoulder portion 224. The outer diameter of the tip portion 222 is generally less than the width of the second slot 194 between the first and second ends 196, 198. The outer diameter of the shoulder portion 224 is greater than the width of the second slot 194 between the first and second ends 196, 198, but less than the width of the first and second ends 196, 198.

The rear portion 220 of the pin 212 is disposed in the opening 214 of the second body 100. The rear portion 220 has an outer diameter that is greater than the outer diameter of the shoulder portion 224. The rear portion 220 defines a cavity 226. In the depicted embodiment, a portion of the spring 216 is disposed in the cavity 226.

Referring now to FIGS. 1-11, a method for engaging the first and second valve assemblies 12, 14 of the fluid coupling 10 will be described. With the sleeve 106 of the second valve assembly 14 in the second rotary position and with each of the first and second ball valve assemblies 20, 104 of the first and second valve assemblies 12, 14 in the closed position, the sleeve 106 is pulled in an axial direction from the first axial position to the second axial position. With the sleeve 106 in the second axial position, the first axial end portion 22 of the first body 16 of the first valve assembly 12 is inserted into the first axial end portion 108 of the second body 100 of the second valve assembly 14. With the first axial end portion 22 of the first body 16 disposed in the first axial end portion 108 of the second body 100, the balls of the second body 100 drop into the retention groove 36 of the first body 16.

The sleeve 106 is then moved toward the first axial position. With the sleeve 106 in the first axial position, the balls of the second body 100 are captured in the retention groove 36 of the first body 16, which prevents the first and second valve assemblies 12, 14 from becoming inadvertently disconnected.

A method for opening the ball valve assemblies 60, 140 of the first and second valve assemblies 12, 14 will now be described. With the first and second valve assemblies 12, 14 engaged, a portion of the outer surface 144 of the second ball valve 140 is disposed in the indentation 66 of the outer surface 64 of the first ball valve 60.

The pin 212 is depressed so that only the tip portion 222 is disposed in the second slot 194. With the pin 212 depressed, the sleeve 106 is rotated about the central longitudinal axis 15 of the fluid coupling assembly 10 in a direction from the second rotary position to the first rotary position. As the sleeve 106 is rotated to the first rotary position, the gear portion 182 of the sleeve 106 sequentially engages the second actuator 142 and the first actuator 62.

The second plurality of teeth 192 of the gear portion 182 engages the plurality of teeth 158 of the second actuator 142. As the sleeve 106 rotates toward the first rotary position, the engagement of the second plurality of teeth 192 of the gear portion 182 of the sleeve 106 and the plurality of teeth 158 of the second actuator 142 causes the second ball valve assembly 104 to rotate about the second longitudinal axis 150 of the second actuator 142 to the open position. In the open position, the passage 148 of the second ball valve 140 is aligned with the bore 112 of the second body 100 and the bore 126 of the second fitting 102. After the second ball valve assembly 140 is in the open position, the second plurality of teeth 192 of the gear portion 182 is disengaged from the plurality of teeth 158 of the second actuator 142.

After the second ball valve assembly 140 is in the open position, the first plurality of teeth 190 of the gear portion 182 of the sleeve 106 engages the plurality of teeth 88 of the first actuator 62. As the sleeve 106 rotates toward the first rotary position, the engagement of the first plurality of teeth 190 of the gear portion 182 of the sleeve 106 and the plurality of teeth 88 of the first actuator 62 causes the first ball assembly 20 to rotate about the first longitudinal axis 76 of the first actuator 62 to the open position. In the open position, the passage 74 of the first ball valve 60 is aligned with the bore 26 of the first body 16 and the bore 47 of the first fitting 18.

When the sleeve 106 is rotated to the first rotary position, the pin 212 extends outwardly so that the shoulder portion 224 is disposed in the first end 196 of the second slot 194. As the shoulder portion 224 has an outer diameter that is greater than the width of the second slot 194 between the first and second ends 196, 198, the pin 212 secures the sleeve 106 in the first rotary position.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A fluid coupling assembly comprising:
   a first valve assembly having a first body defining a bore that extends through the first body;
      a first ball valve assembly engaged to the first body, the first ball valve assembly having:
         a first ball valve disposed in the bore of the first body, the first ball valve defining a passage through the first ball valve;
         a first actuator being engaged to the first ball valve and extending through the first body, the first actuator having a plurality of teeth;
   a second valve assembly selectively engaged to the first valve assembly, the second valve assembly having:
      a second body defining a bore that extends through the second body;
      a second ball valve assembly engaged to the second body, the second ball valve assembly having:
         a second ball valve disposed in the bore of the second body, the second ball valve defining a passage through the second ball valve;
         a second actuator being engaged to the second ball valve and extending through the second body, the second actuator having a plurality of teeth;
      a sleeve disposed about the second body, the sleeve being configured for at least partial rotation about the second body, the sleeve having a gear protrusion including a first plurality of teeth and a second plurality of teeth, the first plurality of teeth engaging the plurality of teeth of the first actuator during only a first portion of rotation of the sleeve, the second plurality of teeth
         a second ball valve disposed in the bore of the second body, the second ball valve defining a passage through the second ball valve;
         a second actuator being engaged to the second ball valve and extending through the second body, the second actuator having a plurality of teeth;
      a sleeve disposed about the second body, the sleeve being configured for at least partial rotation about the second body, the sleeve having a gear protrusion including a first plurality of teeth and a second plurality of teeth, the first plurality of teeth engaging the plurality of teeth of the first actuator during only a first portion of rotation of the sleeve, the second plurality of teeth engaging the plurality of teeth of the second actuator during only a second portion of rotation of the sleeve, wherein the sleeve defines a first slot that extends in a circumferential direction, the second actuator being disposed in the first slot.

2. The fluid coupling assembly of claim 1, wherein the gear protrusion is disposed between the first and second actuators.

3. The fluid coupling assembly of claim 1, wherein the first plurality of teeth extends outwardly in a first direction and the second plurality of teeth extends outwardly in a second direction, the second direction being opposite the first direction.

4. The fluid coupling assembly of claim 1, wherein the second valve assembly includes a locking mechanism that is adapted to retain the sleeve in a rotary position.

5. The fluid coupling assembly of claim 4, wherein the locking mechanism includes a pin that extends radially outward from the second body.

6. The fluid coupling assembly of claim 5, wherein the sleeve defines a second slot that receives the front portion of the pin.

7. The fluid coupling assembly of claim 1, wherein the first valve assembly includes a first fitting engaged to the first body.

8. The fluid coupling assembly of claim 7, wherein the second valve assembly includes a second fitting engaged to the second body.

9. A fluid coupling assembly comprising:
a first valve assembly having a first body defining a bore that extends through the first body;
   a first ball valve assembly engaged to the first body, the first ball valve assembly having:
      a first ball valve disposed in the bore of the first body, the first ball valve defining a passage through the first ball valve;
      a first actuator being engaged to the first ball valve and extending through the first body, the first actuator having a plurality of teeth:
a second valve assembly selectively engaged to the first valve assembly, the second valve assembly having:
   a second body defining a bore that extends through the second body;
   a second ball valve assembly engaged to the second body, the second ball valve assembly having:
      engaging the plurality of teeth of the second actuator during only a second portion of rotation of the sleeve, the sleeve being configured for axial movement from a first axial position to a second axial position for disconnecting the first and second valve assemblies, the sleeve being biased to the first axial position by a spring.

10. A valve assembly comprising:
a body defining a bore that extends through the body;
a ball valve assembly engaged to the body, the ball valve assembly having:
   a ball valve disposed in the bore of the body, the ball valve defining a passage through the ball valve;
   an actuator being engaged to the ball valve and extending through the body, the actuator having a plurality of teeth;
a sleeve disposed about the body, the sleeve being configured for at least partial rotation about the body, the sleeve having a gear protrusion including a plurality of teeth, the plurality of teeth of the sleeve engaging the plurality of teeth of the actuator during rotation of the sleeve to actuate the ball valve between an open position and a closed position, the sleeve defining a first slot that extends in a circumferential direction, the actuator being disposed in the first slot.

11. The valve assembly of claim 10, further comprising a locking mechanism that is adapted to retain the sleeve in a rotary position.

12. The valve assembly of claim 11, wherein the locking mechanism includes a pin that extends radially outward from the second body.

13. The valve assembly of claim 12, wherein the sleeve defines a second slot that receives a front portion of the pin.

14. A method for assembling a fluid coupling assembly, the method comprising:
providing a first valve assembly including:
   a first body having a first axial end portion and an oppositely disposed second axial end portion, the first body defining a bore;
   a first ball valve assembly disposed in the bore;
   a fitting engaged to the second axial end portion of the first body;
providing a second valve assembly including:
   a second body having a first axial end portion and an oppositely disposed second axial end portion, the second body defining a bore;
   a second ball valve assembly disposed in the bore of the second body;
   a fitting engaged to the second axial end portion of the second body;
   a sleeve defining a bore, wherein the second body is disposed in the bore of the sleeve:
pulling the sleeve in an axial direction toward the second axial end portion of the second body;
inserting the first axial end portion of the first body of the first valve assembly into the first axial end portion of the second body of the second valve assembly;
rotating the sleeve about the second body to actuate the first and second ball valve assemblies between an open position and a closed position.

15. The method of claim 14, wherein the actuation of the first and second ball valve assemblies is sequential.

16. The method of claim 14, further comprising depressing a pin of a locking mechanism of the second valve assembly before rotating the sleeve about the second body.

* * * * *